W. H. COLYAR.
CAR MOVING DEVICE.
APPLICATION FILED JAN. 28, 1909.
943,654.
Patented Dec. 21, 1909.
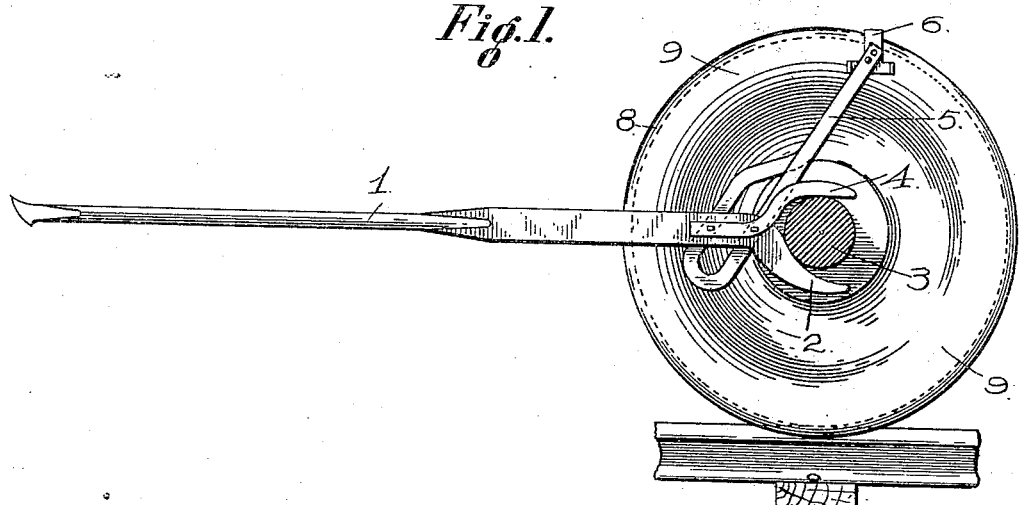
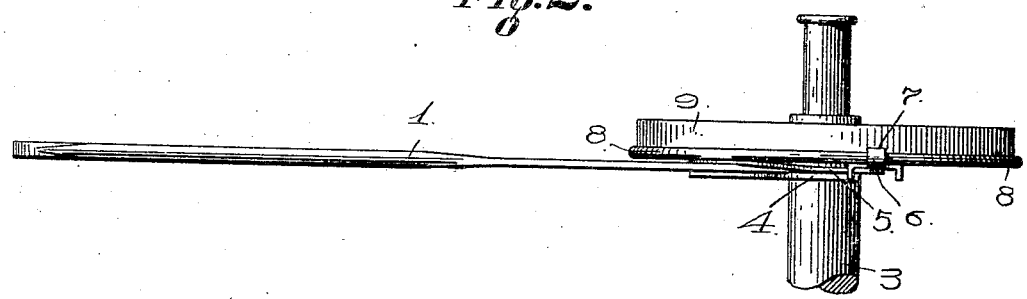
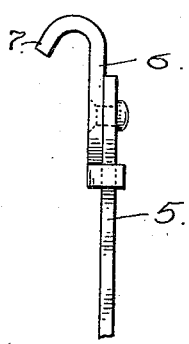
WITNESSES.
Arthur L. Slee.
S. Constine
INVENTOR.
W. H. Colyar
by N. A. Acker
his atty.

UNITED STATES PATENT OFFICE.

WILLIAM HERSCHEL COLYAR, OF SAN FRANCISCO, CALIFORNIA, ASSIGNOR TO PARR-COLYAR WAREHOUSE SUPPLY COMPANY, OF SAN FRANCISCO, CALIFORNIA, A CORPORATION OF CALIFORNIA.

CAR-MOVING DEVICE.

943,654.  Specification of Letters Patent.  Patented Dec. 21, 1909.

Application filed January 28, 1909. Serial No. 474,763.

*To all whom it may concern:*

Be it known that I, WILLIAM HERSCHEL COLYAR, a citizen of the United States, residing in the city and county of San Francisco and State of California, have invented certain new and useful Improvements in Car-Moving Devices, of which the following is a specification.

The hereinafter described invention relates to an improved tool for the moving or shifting of cars mainly within a warehouse, the object being the production of a simple, effective and durable hand actuated tool for enabling a single operator with ease to rapidly move a loaded car from place to place within a warehouse, thereby facilitating the handling and shifting of the cars, and reducing the expense incident thereto to a minimum.

To comprehend the invention, reference should be had to the accompanying sheet of drawings, wherein—

Figure 1 is a side view illustrating the application of the tool to the axle and wheel of a car to be moved or shifted. Fig. 2 is a plan view of the parts disclosed in Fig. 1 of the drawings. Fig. 3 is an enlarged detail end view of the grip pawl for engaging the flange of the car wheel, and the arm to which the same is pivoted.

In the drawings, the numeral 1 is used to designate the operating lever, which at its inner end terminates in the downwardly extended curved jaw 2. This jaw, when the tool is positioned as disclosed by Fig. 1 of the drawings, bears against the under surface of the car axle 3, it being maintained in position or supported by the keeper jaw 4, which is secured to the inner end body portion of the lever 1 and upwardly curved so as to overlie the car axle 3, the said axle being straddled by the jaws 2—4. To the inner portion of the said lever 1 is attached the arm 5, which projects therefrom at an inclination and is extended beyond the axis of the axle 3. At the outer end of the arm 5 is pivotally connected the pawl 6, the overhanging flanged portion 7 of which engages the flange 8 of the car wheel 9. Normally the said pawl 6 hangs perpendicularly, but when a pulling strain is placed thereon the same is swung at an inclination so as to bind onto the flange of the car wheel 9. The pivotal movement of the pawl 6 is limited by oppositely disposed projections or flanges one upon each side of the arm 5 and against which the arm 5 contacts when in operation.

When used for the moving of cars, the operator places the jaws of the lever 1 so as to straddle the axle 3, and the pivoted pawl 6 to engage the flange 8 of the car wheel. As the lever 1 is depressed, the initial movement thereof causes the jaw 2 to act against the car axle 3 as a fulcrum point to throw forwardly a slight distance the arm 5, which swings the pivoted pawl 6 from its perpendicular position, causing the flanged overhanging portion 7 thereof to grip or bind securely onto the flange 8 of the car wheel 9, the parts then standing in tension. As the downward movement of the operating lever 1 is continued, due to the force exerted thereon by the operator, a pushing strain is brought to bear by jaw 2 onto the axle 3 to impart rotation thereto, while at the same time a pulling strain is placed onto the hinged pawl 6, which acting onto the wheel 9 causes the same to revolve forwardly or toward the operator, who walks backward with the forward movement of the car. A compound leverage is thus obtained, the strains being transmitted directly to two moving members of the car to be shifted, there being a pushing strain imparted to the axle for rotating the same and simultaneously a pulling strain placed onto the car wheel for causing the rotation thereof. When the operating lever has reached its full downward stroke, the same is raised by the operator to position the same for downward movement. During the upstroke of the lever, the same turns or swings on the upper keeper jaw 4, which bears on the upper surface of the axle 3 and serves as the pivot for the operating lever. During this stroke of the said lever the arm 5 is thrown inwardly, carrying therewith the hinged pawl 6, which rides on the surface of the car wheel flange 8 to position the same for a new grip or bite onto the wheel, the position of the pawl, shifting relative to the car wheel on each free stroke of the operating lever. On the next down stroke of the said operating lever, the jaw 2 and the grip pawl 6 act in the manner previously described for imparting respectively forward rotation to the axle 3 and wheel 9. The actions of the operating lever are continued until the car has been advanced or shifted into the desired position, for the loading or unloading thereof.

By the use of the described tool an exceedingly powerful leverage force is exerted and placed onto the wheel and axle of the car for the moving thereof, and this at the expenditure of a minimum operating force. In fact, the described tool places it within the power of an ordinary workman to move and shift a heavily loaded car with but slight effort on his part, inasmuch as the operating lever may be worked with ease.

It is obvious that by reversing the position of the operating lever and its associated parts relative to the wheel and axle, that the car may be moved in an opposite direction. In such case the forcing strains will act on the upward stroke of the lever, instead of on the down stroke thereof as described.

Having thus described the invention what is claimed as new and desired to be protected by Letters Patent is—

1. In a tool for the described purpose, the combination with an operating lever provided at its inner end with a jaw for engaging the axle of a car to be moved, an arm extending at an inclination to the lever and connected thereto, a pawl mounted for swinging movement on said arm and a lip on the pawl to engage over the flange of the wheel of the car.

2. In a tool for the described purpose, the combination with an operating lever provided at its inner end with a jaw for engaging the axle of a car to be moved, an arm extending at an inclination to the lever and means for immovably securing the arm to the lever, a pawl having a swinging support on said arm and a lip to engage over the flange of the wheel of the car.

3. In a tool for the described purpose, the combination with an operating lever provided at its inner end with a jaw for engaging the axle of a car to be moved, an arm extending at an inclination to the lever, means for immovably securing the arm to the lever, a pawl having a swinging support on said arm, a lip to engage over the flange of the wheel of the car, and guides for limiting the swinging movement of the pawl.

4. In a tool for the described purpose, the combination with an operating lever provided at its inner end with a jaw for engaging the axle of a car to be moved, an arm extending at an inclination to the lever, means for immovably securing the arm to the lever, a pawl having a swinging support on said arm, a lip to engage over the flange of the wheel of the car, and stops carried by the pawl arranged to engage over opposite sides of the arm.

In testimony whereof I have signed my name to this specification in the presence of two subscribing witnesses.

WILLIAM HERSCHEL COLYAR.

Witnesses:
N. A. ACKER,
EDWARD HOHFELD.